(12) United States Patent
    Paakkinen

(10) Patent No.: US 8,887,501 B2
(45) Date of Patent: Nov. 18, 2014

(54) WAVE POWER PLANT

(75) Inventor: Heikki Paakkinen, Espoo (FI)

(73) Assignee: Wello Oy, Espoo (FI)

( * ) Notice: Subject to any disclaimer, the term of this patent is extended or adjusted under 35 U.S.C. 154(b) by 1148 days.

(21) Appl. No.: 12/593,270

(22) PCT Filed: Mar. 28, 2008

(86) PCT No.: PCT/FI2008/050145
§ 371 (c)(1),
(2), (4) Date: Oct. 26, 2009

(87) PCT Pub. No.: WO2008/119881
PCT Pub. Date: Oct. 9, 2008

(65) Prior Publication Data
US 2010/0115939 A1    May 13, 2010

(30) Foreign Application Priority Data

Mar. 30, 2007  (FI) .................................... 20075217

(51) Int. Cl.
    *F03C 1/00*     (2006.01)
    *F03B 13/12*    (2006.01)
    *F03B 13/20*    (2006.01)
(52) U.S. Cl.
    CPC ............. *F03B 13/20* (2013.01); *F05B 2250/70* (2013.01); *F05B 2240/40* (2013.01); *Y02E 10/38* (2013.01)
    USPC .................. 60/498; 60/499; 60/505; 290/42; 290/53
(58) Field of Classification Search
    USPC ................... 60/495–497; 290/42, 53
    See application file for complete search history.

(56) References Cited

U.S. PATENT DOCUMENTS

| 524,490 A | 8/1894 | Singer et al. |
| 1,584,293 A | 5/1926 | Hegenbarth |
| 1,682,176 A | 8/1928 | Hegenbarth |
| 3,231,749 A | 1/1966 | Hink, III |
| 3,980,527 A | 9/1976 | Lapeyre |

(Continued)

FOREIGN PATENT DOCUMENTS

| FR | 909873 | 5/1946 |
| FR | 2289762 | 5/1976 |

(Continued)

OTHER PUBLICATIONS

Office Action dated Jan. 18, 2012 in Russian Application No. 2009137114/06(052483).

(Continued)

*Primary Examiner* — Hoang Nguyen
(74) *Attorney, Agent, or Firm* — Knobbe Martens Olson & Bear LLP

(57) ABSTRACT

The invention relates to a wave power plant, comprising at least one float or pontoon (1) or a plurality of interconnected floats or pontoons (2). The float or pontoon (1) is shaped or the interconnected floats or pontoons (2) are disposed asymmetrically relative to the advancing direction of waves, such that the float or pontoon (1) or a member (3) linking the interconnected floats or pontoons is set in a gyrating motion in response to the buoyancy of a succession of waves advancing in said direction. The wave power plant includes elements (5, 6, 7; 9, 10) for converting the gyrating motion into a rotational motion for power take-off.

13 Claims, 6 Drawing Sheets

(56) References Cited

U.S. PATENT DOCUMENTS

| | | |
|---|---|---|
| 4,034,231 A | 7/1977 | Conn et al. |
| 4,266,143 A | 5/1981 | Ng |
| 4,317,047 A | 2/1982 | De Almada |
| 4,352,023 A | 9/1982 | Sachs et al. |
| 4,438,343 A | 3/1984 | Marken |
| 4,631,921 A * | 12/1986 | Linderfelt ............... 60/501 |
| 4,781,023 A * | 11/1988 | Gordon ............... 60/506 |
| 7,239,038 B1 | 7/2007 | Zimmeran et al. |
| 2002/0157398 A1 | 10/2002 | Boyd |
| 2008/0018114 A1* | 1/2008 | Weldon ............... 290/53 |
| 2009/0058090 A1* | 3/2009 | Henriksen ............... 290/53 |

FOREIGN PATENT DOCUMENTS

| | | |
|---|---|---|
| GB | 2400143 | 10/2004 |
| JP | 50-22948 | 3/1975 |
| JP | 60-230567 | 11/1985 |

OTHER PUBLICATIONS

Office Action mailed Aug. 27, 2012 in corresponding Japanese Patent Application No. 2010-500310.

Office Action issued May 7, 2013 in corresponding Finnish Patent Application No. 20075217.

Office Action mail May 22, 2013 in corresponding Japanese Patent Application No. 2010-500310.

Extended European Search Report issued Jul. 25, 2013 in corresponding Application No. 08736794.2.

* cited by examiner

WAVE POWER PLANT

The invention relates to a wave power plant, comprising at least one float or pontoon or a plurality of interconnected floats or pontoons.

In an alternative embodiment of the invention, the wave power plant comprises anchored underwater blades.

The document U.S. Pat. No. 4,266,143 discloses a wave power plant with an objective of converting the side-to-side tilting of a floating tank into rotational motions of two heavyweight gravity wheels rotating in opposite directions. The floating tank is symmetrical and the gravity wheels are provided with an opposite phasing in an effort to ensure that the tilting only occurs from side to side.

A problem with this and other prior known wave power plants is the irregular motion of waves and the fluctuation of wave sizes. A high efficiency conversion of this reciprocating motion into a continuous rotational motion has been difficult to achieve.

An object of the invention is to provide a novel type of wave power plant, in which the foregoing problems are resolved by having the reciprocating motion of waves converted directly into a continuous rotational motion.

This object is achieved by the invention on the basis of the characterizing features presented in the appended claim 1. An alternative embodiment of the invention is presented in claim 12. Preferred embodiments of the invention are disclosed in the dependent claims.

The basic idea of the invention lies in the fact that the shaping and/or disposition of floats or pontoons are used for setting an axle associated therewith in a gyrating motion, from which is directly obtained a continuous rotational motion by means of a rotator or an angular shaft.

The invention will now be described by way of exemplary embodiments with reference to the accompanying drawings, in which FIG. 1 shows schematically a wave power plant according to one preferred embodiment of the invention.

Figure 1:
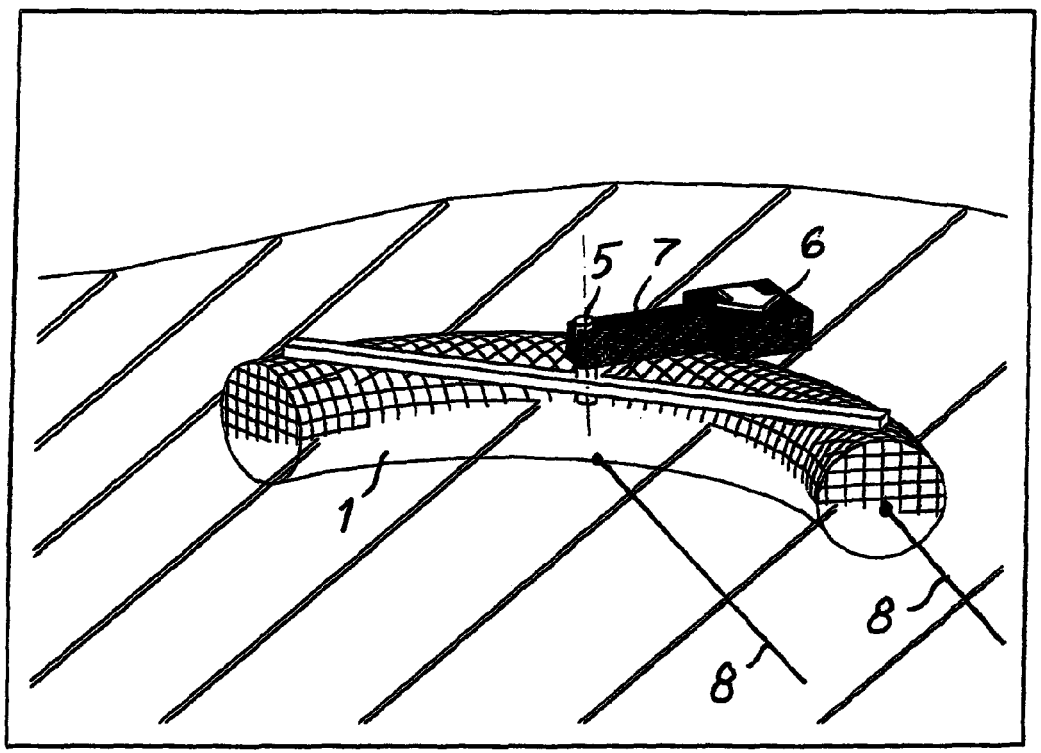
Figure 2:
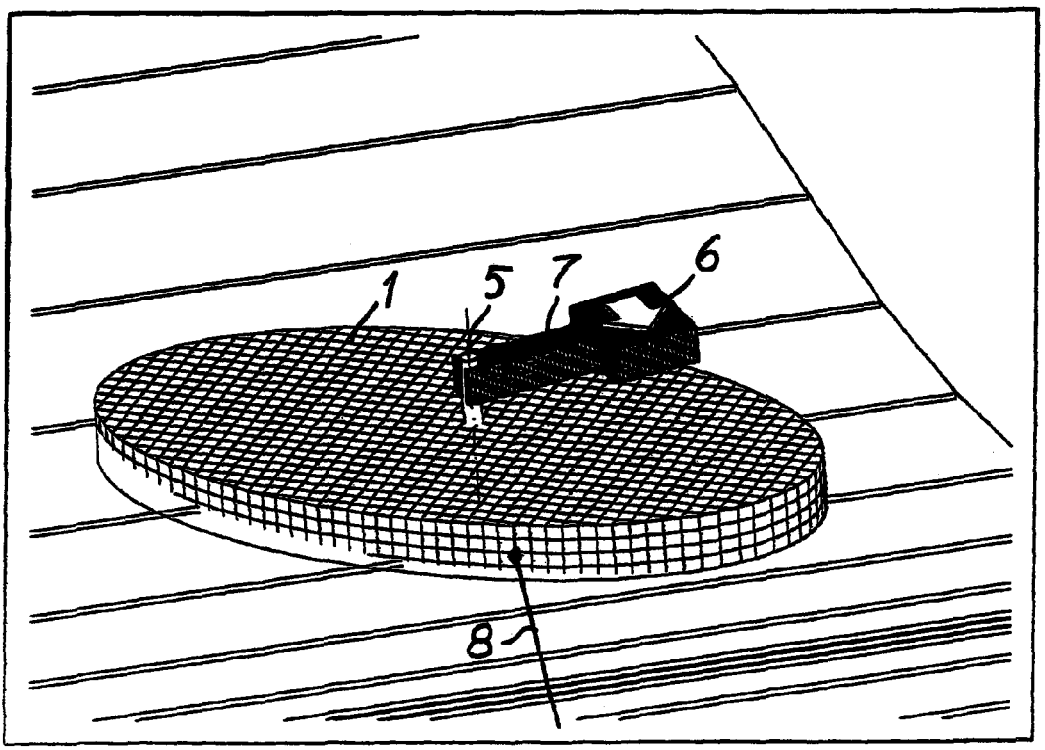
FIGS. 2 and 3 show variants for the wave power plant of FIG. 1, wherein the corresponding action is achieved by various float or pontoon designs.
Figure 3:
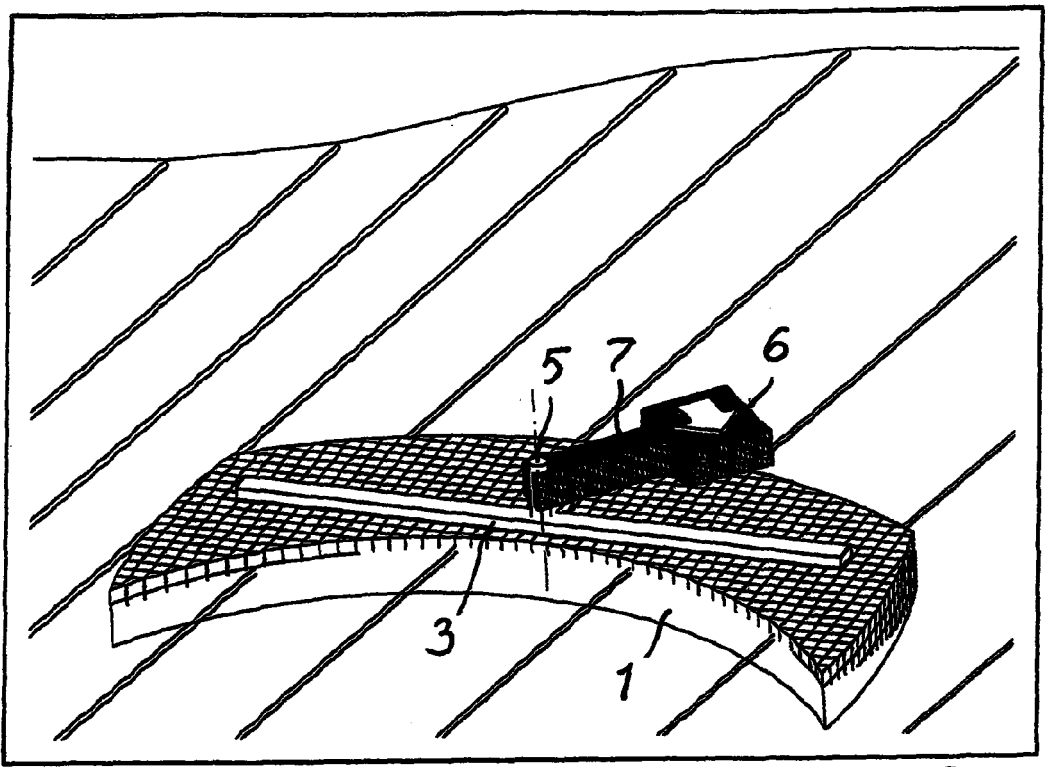
Figure 4:
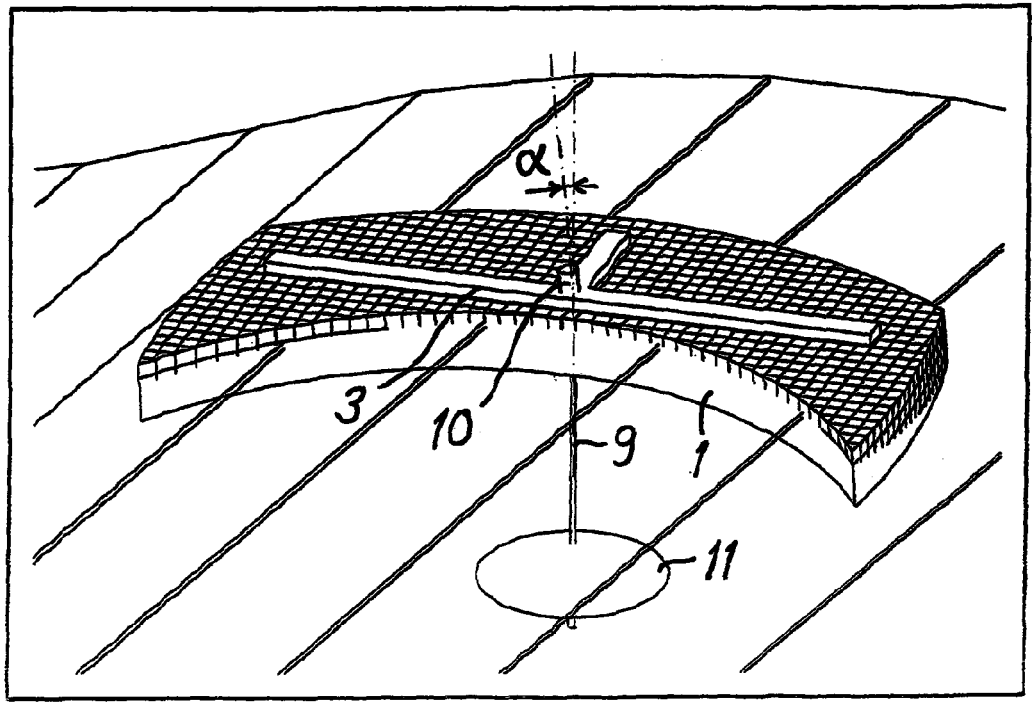
FIG. 4 shows the use of an arcuate pontoon similar to that shown in FIG. 3, yet provided with an alternative arrangement for power take-off.

What is common to the embodiments of FIGS. 1-4 is that a float or pontoon 1 is therein designed asymmetrically relative to the advancing direction of waves, such that the float or pontoon 1 finds itself in a gyrating motion in response to the buoyancy of a succession of waves advancing in said direction. In FIGS. 1-4, the direction of wave crests is shown by double lines. The float or pontoon 1 is anchored by long wire cables 8 to a predetermined angular position (typically longitudinally) relative to the traveling direction of waves. The anchorage is implemented in such a way that the float or pontoon 1 retains its angular position despite the changing direction of waves. In the cases of FIGS. 1, 3 and 4, the float or pontoon 1 is arcuate, specifically in the shape of a banana or a croissant. In the preferred embodiment of FIG. 1, the float or pontoon 1 has a cross-section which is circular or oval at least over its portion encircled by water. Hence, the tilting action thereof about its longitudinal axis encounters as little drag as possible. In the embodiment of FIG. 2, the float or pontoon 1 is in the shape of an ellipse or oval and anchored by the wire cable 8 in a position at which the ellipse or oval has its major axis forming an acute angle with the advancing direction of waves.

What is common to designs of the float or pontoon 1 as depicted in FIGS. 1-4 is that, as the waves meet with a float or pontoon at a certain angle, the float or pontoon finds itself in a gyrating motion as the points of a triangle formed by its ends and its central region rise and fall in an unequal phase. The ellipse of FIG. 2 includes two such gyrating "triangles" facing each other, whereby the direction must be selected in such a way that the "triangles" do not lie symmetrically relative to the traveling direction of waves, thus avoiding mere back-and-forth flapping and turning the movement into a gyrating motion. This is further promoted through the action provided by the mass of a subsequently described rotator, which in its rotation always strives to tilt the power plant more towards the direction in which a counterforce (buoyancy) delivered by the floats or pontoons is the lowest.

The embodiments of FIGS. 1-3 feature similar elements 5, 6, 7 for converting a gyrating motion into a rotational motion for power take-off. A heavyweight rotator 6 is bearing-mounted rotatably around a gyrating axle 5 fixed to the float or pontoon 1. The rotator 6 is linked to the gyrating axle 5 by means of a moment arm 7 of desired length. The arm can have its length pneumatically or hydraulically adjustable, whereby the power produced by the rotator during its rotation can be regulated according to the size of successive waves. The axle 5 rotated by the rotator 6 can be adapted to drive an electric generator. In a practical embodiment, the rotator 6 along with its arm 7 and axle 5 (which jointly constitute a rotator) can be set inside a hollow closed float or pontoon. With the gravity attracting the rotator mass downwards, the rotator 6 is set in a rotational motion by a gyrating motion of the axle 5. The axle 5 has a trajectory which is in the form of a cone whose cross-section can be other than a circular form, e.g. elliptical, because a tilting action of the power plant can be unequal in various directions.

FIG. 4 illustrates an alternative implementation for power take-off. To the pontoon 1 is suspended a weight 11 by way of a vertical shank 9. To the pontoon's 1 bracket is attached an axle 10 present as an extension of the shank 9 with a slight angular deviation α. This angular deviation α is chosen to substantially match the angular deviation in a gyrating motion of the float or pontoon 1. Inside the shank 9 and the axle 10 is rotatably bearing-mounted an angular shaft whose angular shaft section present on one side of its elbow lies inside the axle 10 and whose angular shaft section present on the other side of the elbow is rotatably bearing-mounted inside the shank 9. Since the shank 9 and the weight 11 do not perform a gyrating motion, the angular shaft finds itself in a rotational motion as the float or pontoon 1 performs a gyrating motion. Consequently, the power can be taken off of the rotating angular shaft.

Figure 5:
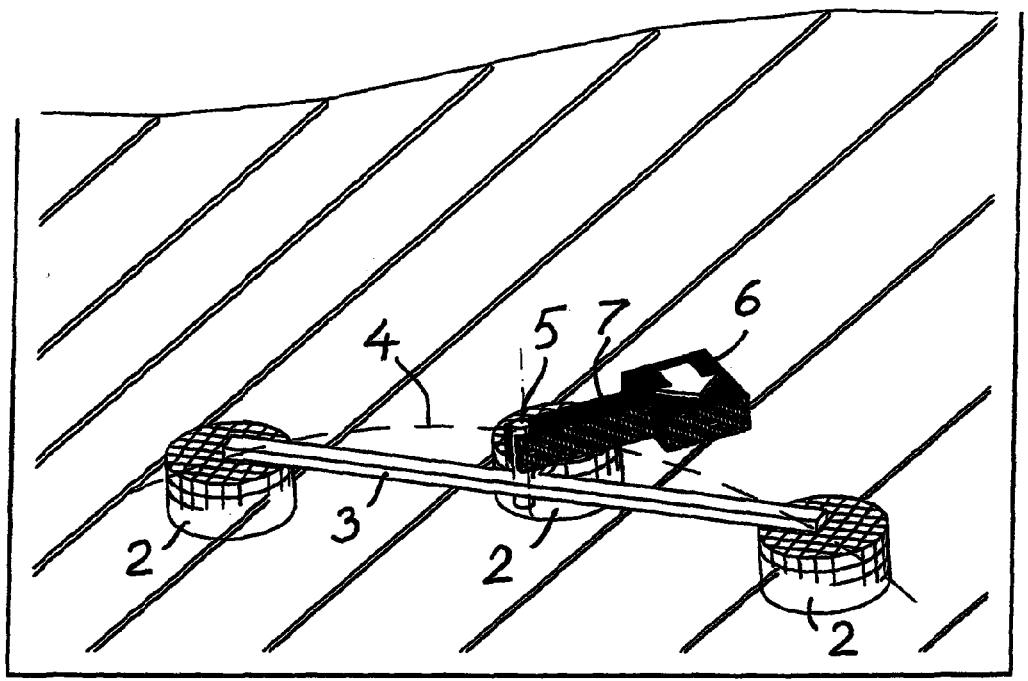
FIGS. 5, 6 and 7 show embodiments, wherein the gyrating motion is not effected by the design of a single pontoon as in the embodiments of FIGS. 1-4, but by the disposition of a plurality of individual pontoons over an arcuate path.
Figure 6:
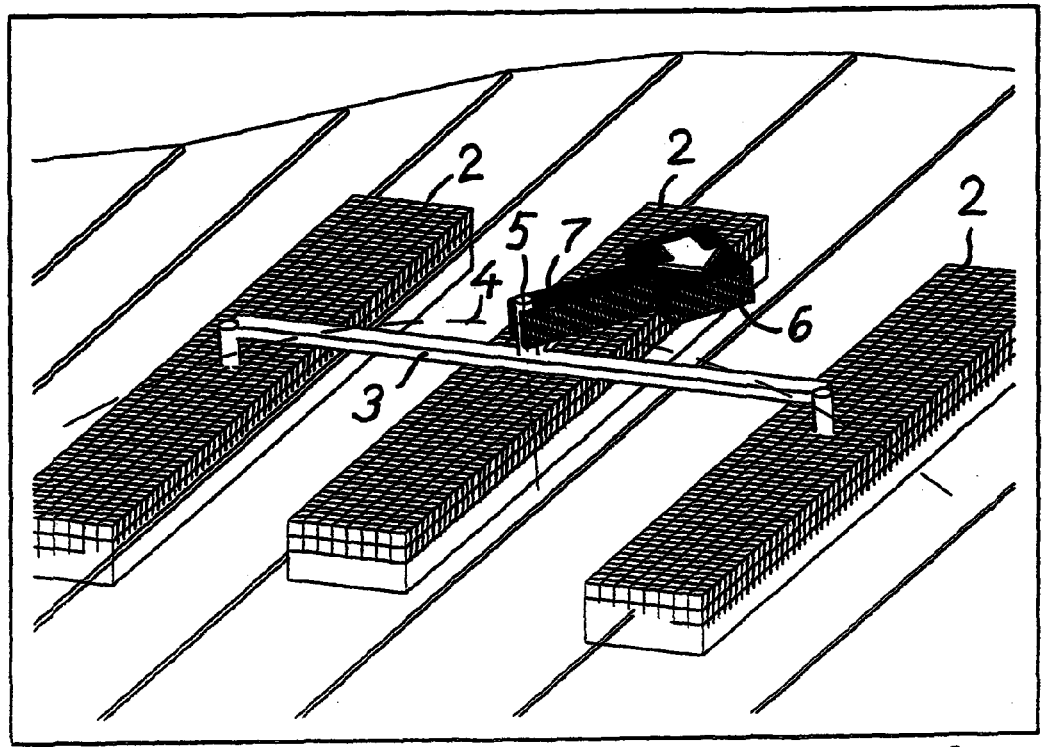
Figure 7:
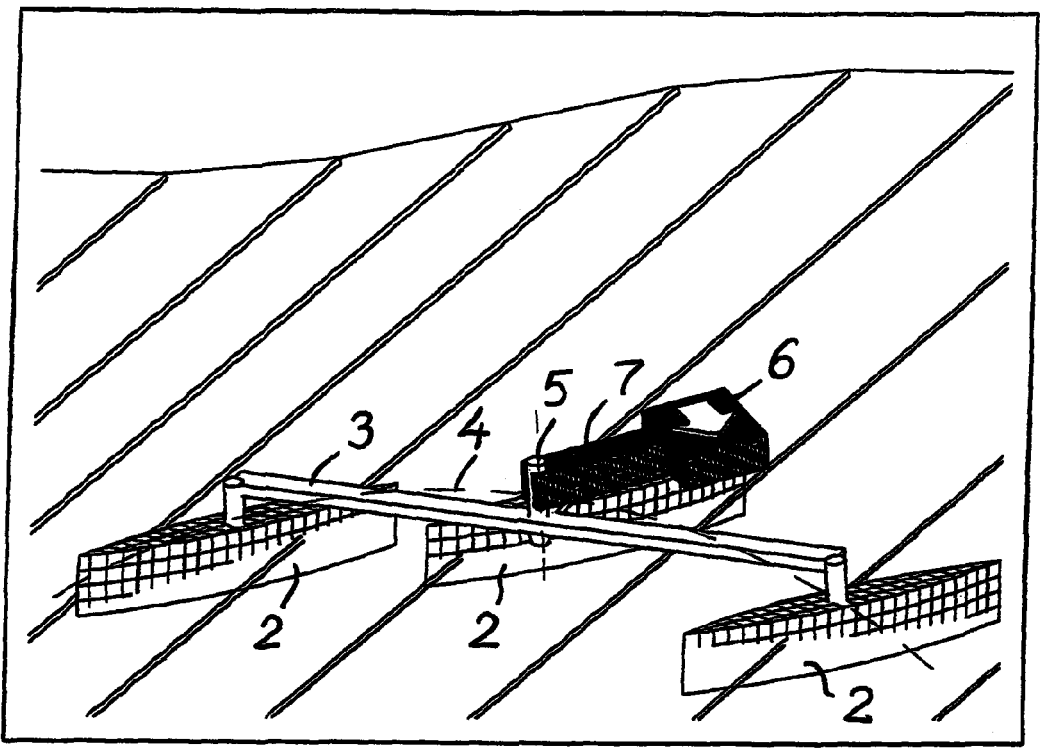

In the embodiments of FIGS. 5-7 there are at least three floats or pontoons 2 fixed to a common bracket 3 in such a way that the floats or pontoons 2 have their centers of buoyancy located along an arcuate path 4. Thus, various pontoons 2 rise and fall in an unequal phase as long as the distances therebetween and the angular position thereof relative to the traveling direction of waves are appropriate. Typically, a triangle formed by three pontoons is anchored in such a way that a straight line extending through two pontoons is coincident with the incoming direction of a wave. The bracket 3 is forced to a gyrating motion, from which the power can be taken off with a rotator 6 bearing-mounted in a similar manner rotatably on the gyrating axle 5. In view of avoiding stress on the axle 5, it is naturally possible to provide underneath the rotator 6 a guide track for resting the rotator 6 thereon by way of a bearing. Of course, the power take-off can be effected without an actual axle 5 just by means of a weight moving along an arcuate path. However, the power take-off is easier by using a rotating axle 5. FIG. 6 illustrates elongated floats or pontoons 2, which establish a "waving" carpet. The floats or pontoons 2 are fastened to the bracket 3 by means of pivot joints which are crosswise to the longitudinal direction thereof. Even in this case, the floats or pontoons 2 have their supporting points located along a curve 4.

In the embodiment of FIG. 7, the floats or pontoons 2 are of a streamlined design, thus enabling the attachment thereof to a vessel which, when supported by the pontoons 2, is forced to a gyrating motion in a succession of waves. In order to ensure a gyrating motion in various traveling directions of the vessel, the pontoons 2 are preferably designed to be adjustable in terms of the relative positions thereof. A rotational motion derived from the gyrating motion functions as a motor for propelling the vessel or an electric generator driven thereby can be used for charging batteries functioning as a power supply for the vessel.

Figure 8:
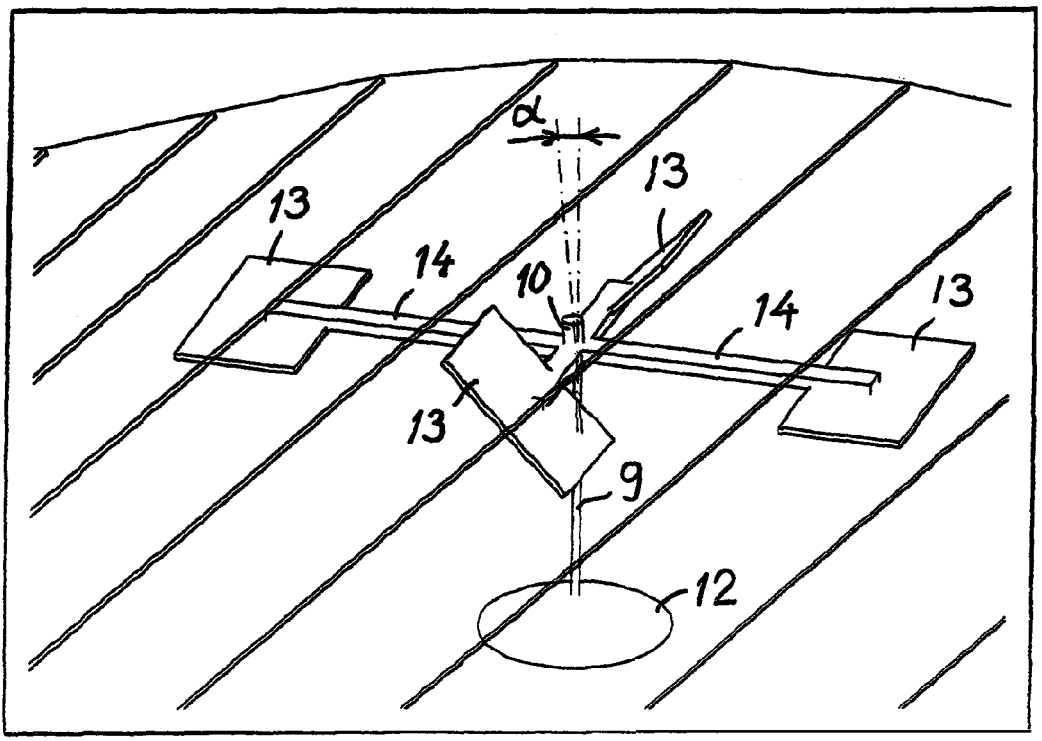
FIG. 8 shows an alternative way of implementing the invention by the use of blades, which are anchored at a set angle below the water surface and which are not rotating around any shaft but are flapping back and forth, thus setting an axle 10, fixed to a bracket 14 common to the blades, in a gyrating motion which is utilized to create a rotational motion.

FIG. 8 illustrates an alternative embodiment of the invention, wherein blades 13 anchored below the surface of water are engaged with a common bracket 14 with such blade angles that the bracket 14 is set in a gyrating motion in response to intra-wave currents. The anchorage can be implemented e.g. by means of a vertical shank 9, having an anchoring weight 12 at its bottom end. In this case as well, the take-off of power is proposed to be implemented with an angular shaft, which is bearing-fitted inside an axle bushing 10 associated with the bracket 14 and inside the shank 9 (or outside the shank 9), such that the angular shaft has its elbow between the shank 9 and the axle bushing 10. When the axle bushing 10 gyrates with a slight angular deviation α (which is equal to the angular shaft's elbow angle) between itself and the shank 9, the angular shaft shall be forced to a rotational motion. Here, as well as in the embodiment of FIG. 4, the angular shaft's elbow angle can be varying around a single crosswise articulated shaft, whereby the gyration angle α between the axle bushing 10 and the shank 9 can be of a fluctuating size.

Figure 9:
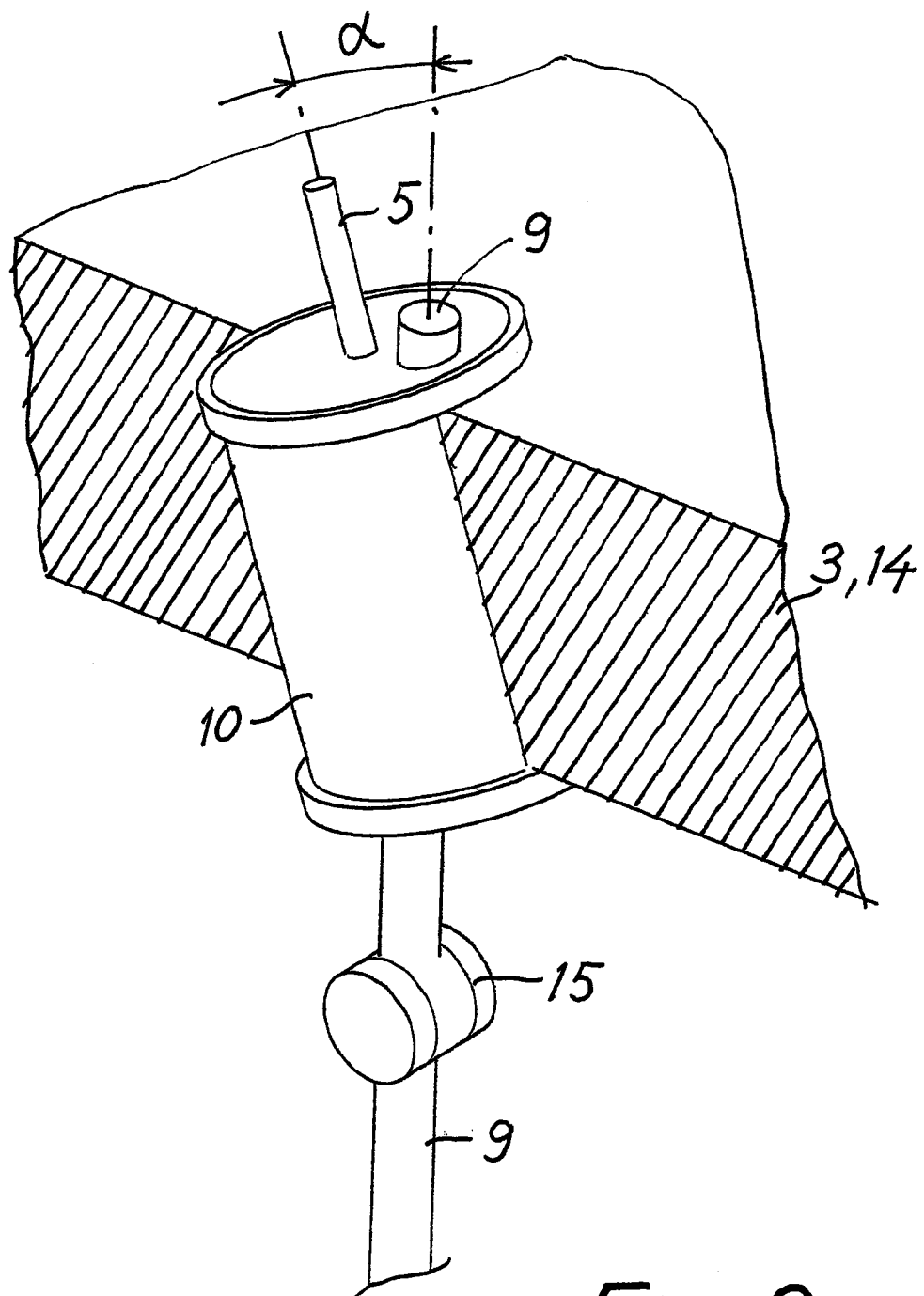
FIG. 9 shows one exemplary embodiment for elements by which a gyrating motion can be converted into a rotational motion.

FIG. 9 shows even more closely one exemplary embodiment for elements enabling the conversion of a gyrating motion into a rotational motion. On a bracket 3 or 14, equivalent to FIGS. 4 and 8, is rotatably bearing-mounted an axle 10, inside which is rotatably bearing-mounted a second axle 9 with an angular deviation α. When the axle 10 effects a gyrating motion, the fixedly bearing-mounted axle 9 forces the axle 10 also to rotate around its axis. On the rotation axis of the axle 10 is fixed a power take-off axle 5, which drives e.g. an electric generator. The shank 9 can be provided with a pivot axle 15, which allows for angular deviations other than the angle α between the shank 9 and the axle 10.

If desired, the embodiment of FIG. 8 can be constructed underneath the embodiments of FIGS. 1-6, thus exploiting the buoyancy and the internal flowing power of the same waves. Thus, the shank 9 and the anchor 12 depicted in FIG. 8 are not necessarily needed, but the power can be taken off by way of an angular shaft which is fitted between the wave power plant elements provided with pontoons and blades. Of course, it is necessary to make sure that these wave power plant elements each perform their specific gyrating motions in unequal phases for providing therebetween an angular deviation α capable of rotating the angular shaft.

Figure 10:
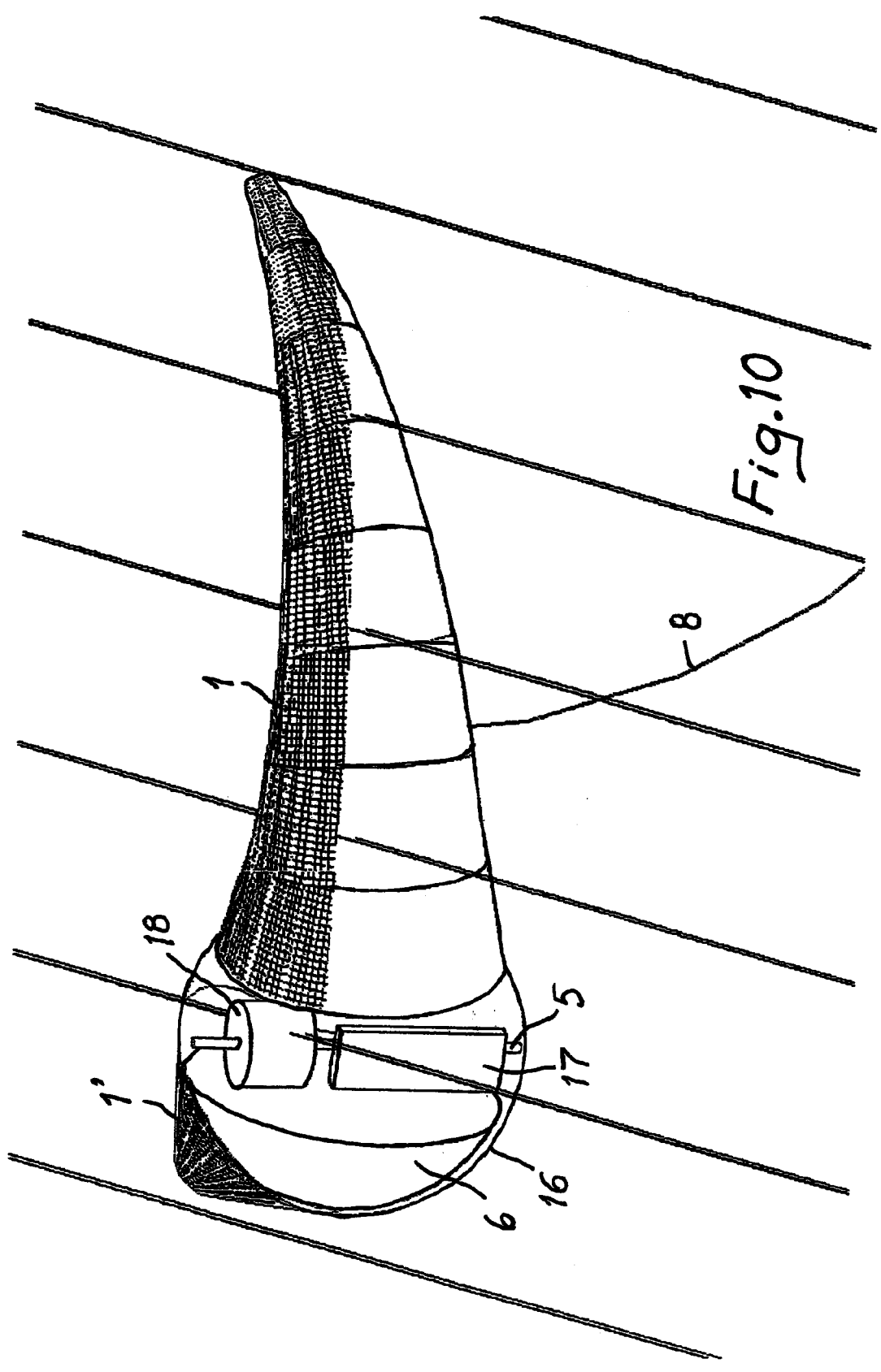
FIG. 10 shows still another exemplary embodiment for a wave power plant of the invention in a partially cut-way view.

In the embodiment of FIG. 10, a rotator housing is in the shape of a hollow body of revolution, e.g. in the shape of a sphere, a flattened sphere or a cylinder or in the intermediate shape between a sphere and a cylinder. A lengthwise tapering arcuate float 1 extends from the rotator housing 16 against the incoming direction of waves, such that between the incoming direction of waves and the arcuate float 1 there is an acute angle which increases towards the tip of the float and in the proximity of the float end is more than 30°, preferably within the range of 30°-70°. A second arcuate float 1', which can be shorter than the float 1, extends from the opposite side of the rotator housing 16 in the outgoing direction of waves, such that between the float 1' and the outgoing direction of waves there is also an acute angle, which increases towards the tip of the float 1'.

The rotator 6 has its external surface matching the internal surface outline of the rotator housing 16. The rotator 6 is mounted on a gyrating axle 5 by way of a post, which consists of an upright plate or several shanks on top of each other. A generator 18 and a possible transmission are also accommodated in the rotator housing 16. The float 1 has its water line matching roughly the edge of hatching.

The invention claimed is:

1. A wave power plant, comprising at least one float or pontoon or a plurality of floats or pontoons interconnected by at least one member, wherein the float or pontoon is shaped and anchored asymmetrically or the interconnected floats or pontoons are disposed and anchored asymmetrically relative to the advancing direction of waves, the asymmetric shape or disposition sets the float or pontoon or member linking the interconnected floats or pontoons in a gyrating motion in response to the buoyancy of a succession of waves advancing in said direction, and the wave power plant including elements for converting the gyrating motion into a rotational motion for power take-off wherein the at least one float or pontoon or the at least one member interconnecting a plurality of floats or pontoons has secured thereto a substantially vertical axle, free to move such that the vertical axle follows a tilting action of the power plant to perform said gyrating motion, said vertical axle has a trajectory which is in the form of a cone whose cross section can be other than a circular form, and a heavyweight rotator is mounted with bearings for rotation around said gyrating axle; and an anchoring system configured to maintain said at least one float or pontoon or plurality of floats or pontoons asymmetrically relative to the advancing direction of waves.

2. A wave power plant as set forth in claim 1, wherein that the at least one float or pontoon or the at least one member interconnecting a plurality of floats or pontoons is anchored with long wire cables to a predetermined angular position relative to the advancing direction of waves, the wire cables being allowed to shift in response to the advancing direction of waves with the result that said angular position is maintained while the direction of waves changes.

3. A wave power plant as set forth in claim 1, wherein that the float or pontoon is arcuate, specifically in the shape of a banana or a croissant.

4. A wave power plant as set forth in claim 3, wherein that the float or pontoon has a cross-section which is circular or oval at least over its portion encircled by water.

5. A wave power plant as set forth in claim 1, wherein that the float or pontoon is in the shape of an ellipse or oval and anchored in a position at which the ellipse or oval has its major axis forming an acute angle with the advancing direction of waves.

6. A wave power plant as set forth in claim 1, wherein that at least three floats or pontoons are secured to the common member in such a way that the floats or pontoons have their centers of buoyancy located along an arcuate path.

7. A wave power plant as set forth in claim 1, wherein that the rotator is linked to the gyrating axle with a moment arm of desired length, and that the rotator is set in a closed rotator housing outside of which lies at least one arcuate float or several triangularly disposed floats.

8. A wave power plant as set forth in claim 1, wherein that the axle has rotatably bearing-mounted thereon an angular shaft section present on one side of the angular shaft's elbow, while an angular shaft section present on the other side of the elbow is rotatably bearing-mounted on a structure, which does not perform a gyrating motion or performs it in a phase different from that of the first-mentioned gyrating axle.

9. A wave power plant as set forth in claim 6, wherein that the pontoons, which are adjustable in terms of their relative positions, are attached to a vessel which, being supported by said pontoons, is set by the succession of waves in a gyrating motion adapted to be converted into a vessel-propelling power.

10. A wave power plant, comprising underwater anchored blades, wherein that the blades are engaged with a common bracket with such blade angles that the bracket is forced to a gyrating motion in response to intra-wave currents, and that the wave power plant includes elements for converting the gyrating motion into a rotational motion for power take-off, wherein that said elements for converting a gyrating motion into a rotational motion include a substantially vertical axle, said vertical axle follows a tilting action of the power plant and has a trajectory which is in the form of a cone whose cross section can be other than a circular form.

11. A wave power plant as set forth in claim 10, wherein that the substantially vertical axle is fixed to the bracket and on which is rotatably bearing-mounted an angular shaft section present on one side of the angular shaft's elbow, while an angular shaft section present on the other side of the elbow is rotatably bearing-mounted on a structure, which does not perform a gyrating motion or performs it in a phase different from that of the first-mentioned gyrating axle.

12. A wave power plant as set forth in claim 1, wherein that said elements for converting a gyrating motion into a rotational motion include an axle, which is rotatably bearing-mounted on the bracket and on which is in turn rotatably bearing-mounted, with an angular deviation $\alpha$, a second axle, which is anchored so as not to join the bracket in its gyrating motion.

13. A wave power plant as set forth in claim 12, wherein that said second axle is provided with a pivot joint, allowing for angular deviations other than said angular deviation $\alpha$ between the bracket-mounted axle and said second axle.

\* \* \* \* \*